April 9, 1968    R. A. EKSTROM, JR    3,376,750
SLACK DIAPHRAGM FLUID GAUGE
Filed Sept. 29, 1965    3 Sheets-Sheet 1
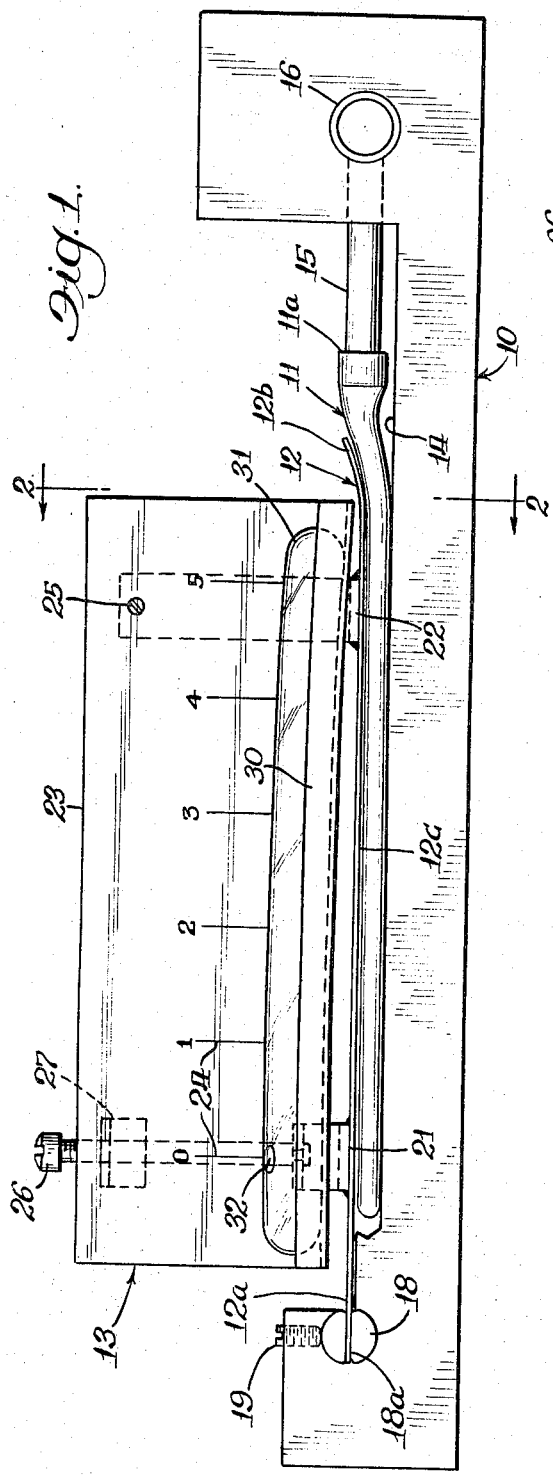
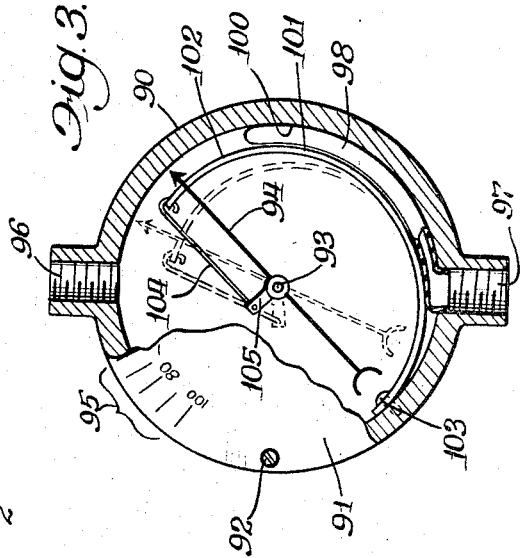
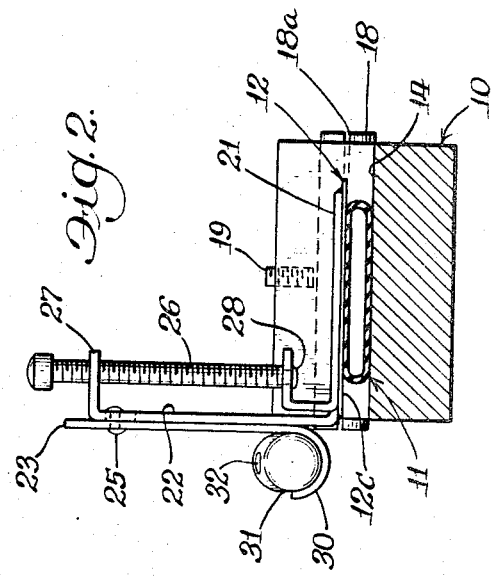
Inventor:
Regner A. Ekstrom, Jr.
By: Darbo, Robertson &
Vandenburgh
Attys

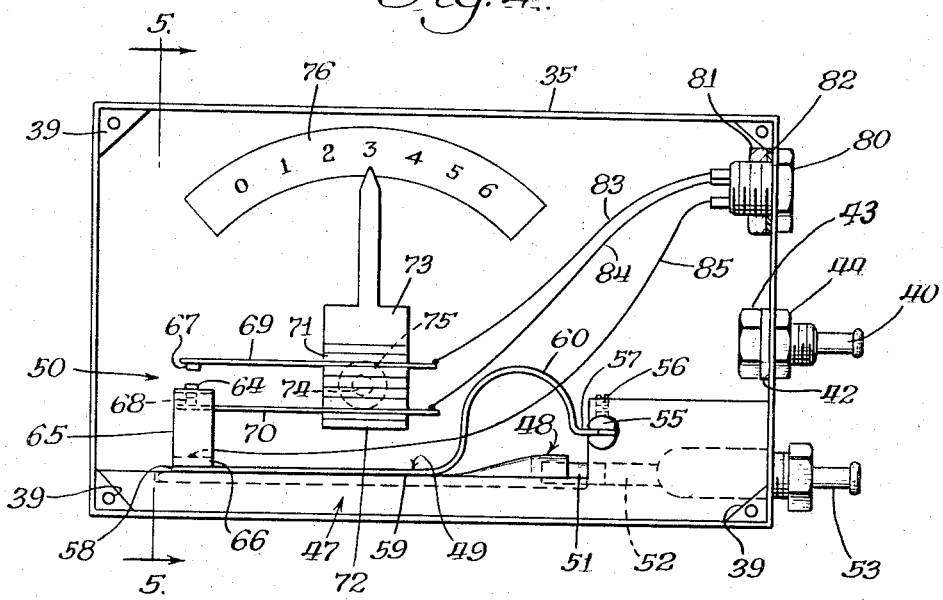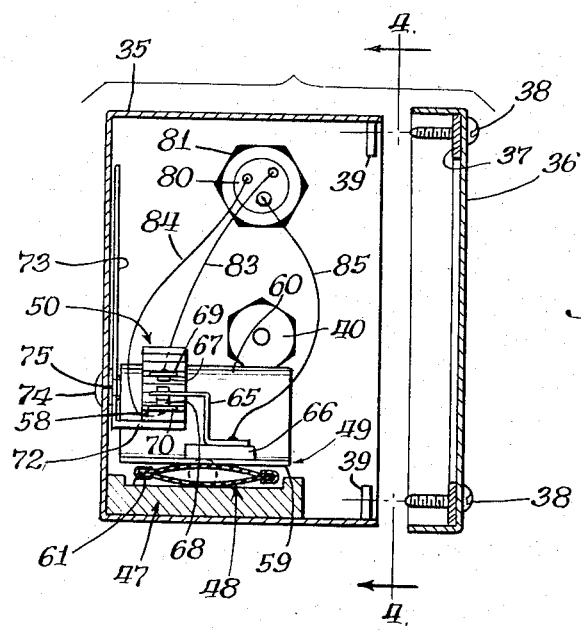

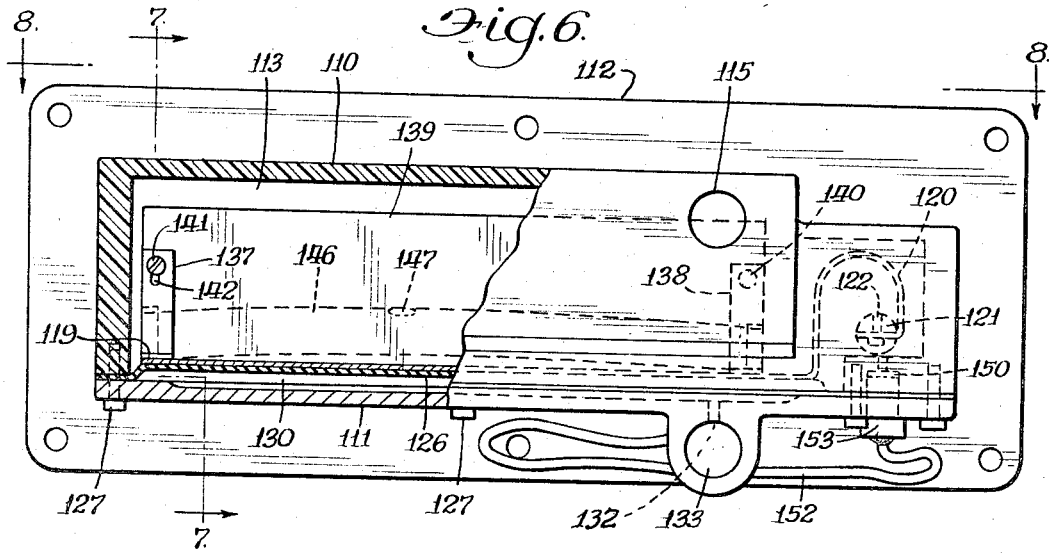
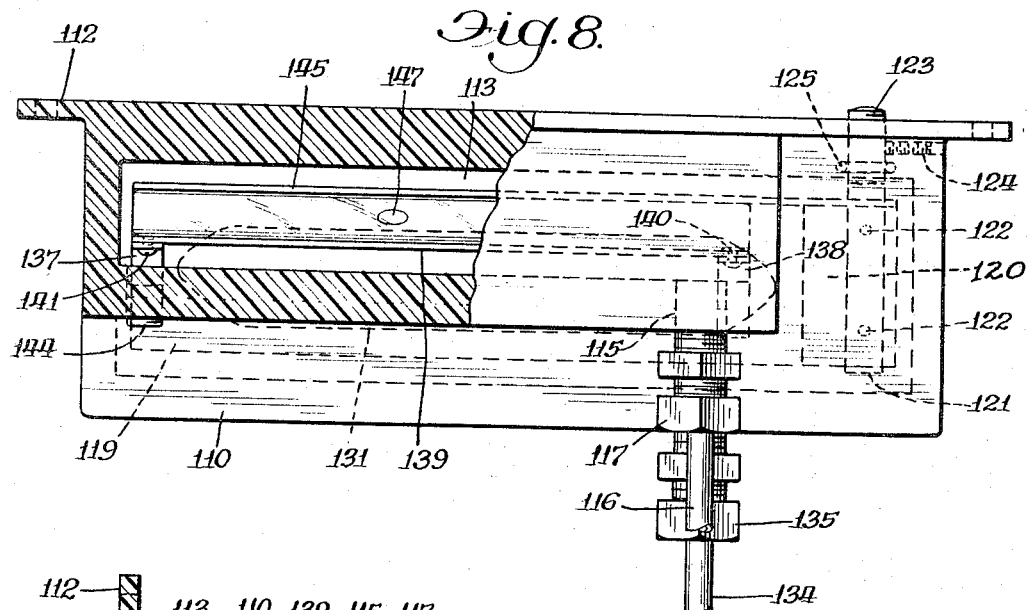
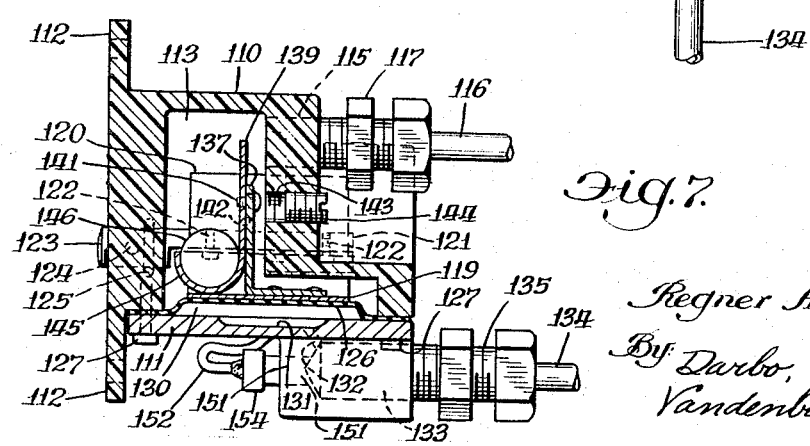

United States Patent Office 3,376,750
Patented Apr. 9, 1968

3,376,750
SLACK DIAPHRAGM FLUID GAUGE
Regner A. Ekstrom, Jr., % R. A. Ekstrom Co.,
Harvey, Ill. 60427
Filed Sept. 29, 1965, Ser. No. 491,097
9 Claims. (Cl. 73—409)

ABSTRACT OF THE DISCLOSURE

A fluid gauge is provided which incorporates a slack diaphragm, which may be in the form of a sac to define a pressure chamber. In other embodiments, the chamber is formed by the case and diaphragm. Some embodiments have pressure chambers both sides of the diaphragm so as to define a differential gauge. An embodiment has a laminar flow passageway between the two chambers. In some embodiments an elongated strip of metal has one end attached to the frame with the other end being biased against the diaphragm. The attachment comprises a cylinder rotatable about an axis and releasably affixable at ny desired position. The elongated strip forms a loop between the ends. In some embodiments a bubble glass is attached to the strip by an adjustable mounting. The strip can be employed to actuate a switch.

---

The present invention relates to a fluid gauge embodying a slack diaphragm, and the following disclosure thereof is offered for public dissemination upon the grant of a patent therefor.

As will be apparent to those skilled in the art from the description herein, the present invention is applicable to pressure gauges of the type where a single pressure is being measured as compared to atmospheric pressure, or it is applicable to differential pressure gauges wherein two pressures (neither related to atmospheric) are compared. It will also be apparent that the principles of my invention can be employed in a pressure gauge for measuring pressures less than atmospheric, commonly referred to as a vacuum. To the extent that the term "pressure gauge" is employed herein, it is intended to embrace such various embodiments.

I have invented a pressure gauge, embodying a slack diaphragm, which is capable of being produced in embodiments of various types which have a surprisingly high degree of accuracy in the light of their cost as compared with more conventional forms of pressure gauges. These embodiments are rugged and dependable. To the extent that adjustments are necessary to obtain the proper "0" reading of the gauge, such adjustments can be easily and quickly made. These gauges are of such a character that they facilitate the manufacture of a (rate of) flow meter as a compact integral unit. I have devised a flow meter that has a high degree of accuracy yet is an easily made, compact, single unit. It does not involve the production problems attendant the manufacture of an orifice type flow meter when a good degree of accuracy is desired.

Further objects and advantages will become apparent from the following description taken in conjunction with the drawings in which:

FIGURE 1 is an elevational view of one embodiment of my invention;

FIGURE 2 is a section as viewed at line 2—2 of FIGURE 1;

FIGURE 3 is an elevational view, with portions broken away, of a second embodiment of my invention;

FIGURE 4 is a side view, with the cover removed, of another embodiment of my invention, as seen at line 4—4 of FIGURE 5;

FIGURE 5 is a section as viewed at line 5—5 of FIGURE 4;

FIGURE 6 is a side elevation, with portions broken away of another embodiment of the invention in the form of a flow meter;

FIGURE 7 is a section as seen at line 7—7 of FIGURE 6; and

FIGURE 8 is a view as seen at line 8—8 of FIGURE 6 with a portion broken away.

Although the following disclosure offered for public dissemination is detailed to ensure adequacy and aid understanding this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

Each of the embodiments herein described incorporate a slack diaphragm having one fluid pressure applied to the one side thereof and a second fluid pressure applied to the other side. Such diaphragms may be of a flexible plastic or rubber-like material. A chloroprene rubber such as that sold under the trademark Neoprene is eminently suited for them. It is important that such diaphragms be used in a manner such that they remain "slack" diaphragms that is, at no stage during their use should there be a stretching of the diaphragms (in the manner in which one inflates a balloon). If there is a significant stretching (and thus it does not remain a "slack" diaphragm), the mechanical work that is present in the stretching and return will create an error in the pressure gauge readings.

In the majority of the embodiments described herein the diaphragm forms a part of a sac. Thus the pressure chamber has all of its walls slack rather than only the "diaphragm wall slack as in the case of a single or simple diaphragm. From a manufacturing standpoint the sac type has some advantages. For example, it normally is more simple, and thus less expensive, to assemble the apparatus of the sac type.

Embodiment of Figures 1 and 2

In this embodiment there is a body or base generally 10, a slack sac generally 11, a contact member generally 12 and an indicating means generally 13. Body 10 has a contact surface 14 in juxtaposition to the underside of sac 11. The base also supports a tube 15 which extends into the mouth 11a of sac 11. Tube 15 also communicates with a tapped opening 16 adapted to receive a pipe fitting or the like for communication with the interior of sac 11.

A cylinder 18 is received in a cylindrical opening in body 10 and is rotatable about its axis with respect to the body. End 12a of member 12 is fixed in a slot in cylinder 18. At its end, cylinder 18 is provided with a screwdriver slot 18a. While cylinder 18 may be normally held against rotation about its axis by its friction with body 10, I prefer to employ a setscrew 19 for this purpose. Member 12 has a free end 12b and on the underside of the member between the ends thereof it has a contact base 12c in juxtaposition to sac 11.

Secured to member 12 are two mounting brackets 21 and 22. A plate 23 having indicia 24 thereon is pivotally secured to bracket 22 by a pin 25. An adjusting screw 26 is threaded into bracket 27 on plate 23. The lower end of screw 26 is rotatably received in bracket 21 and has a head 28 to prevent vertical movement of the screw with respect to the bracket. Thus, by rotating screw 26 in one direction or the other the plate 23 is pivoted in one direction or the other about pin 25.

The bottom of plate 23 forms a lip 30 to hold a bubble glass or vial 31. Glass 31 is secured in lip 30 by cement. It is filled with a liquid except for a bubble 32 of air or other gas. It has a slight curvature from end to end, the curvature being positioned with its chord downwardly as viewed in FIGURE 1.

Adjusting screw 26 is set so that bubble 32 is on the 0 line of indicia 24 when body 10 is resting on a planar surface at the location in which the gauge is to be used (or is otherwise mounted against tipping) and no pressure is applied to the interior of sac 11. As a fluid under pressure is injected into sac 11 through tube 15 and the fitting in opening 16, the upper and lower sides of the tube are forced apart. This is done without any stretching of the tube walls. Thus, the upper and lower sides of the tube press against the contact base 12c and the contact surface 14 respectively urging member 12 upwardly away from base 10. Member 12 is made of a spring metal and is biased downwardly so as to resist this upward movement. The amount of bias may be adjusted by loosening setscrew 19 and rotating cylinder 18. Thus, rotation in a clockwise direction in FIGURE 1 will increase the downwardly bias of member 12, while rotation of cylinder 18 in a counterclockwise direction will decrease the amount of bias. Thus, for example, if indicia 24 are representative of pressure above atmospheric in inches of mercury, the bias would be set so that when the fluid pressure in sac 12 was one inch of mercury the member 12 and the vial 31 would tip upwardly at the right ends thereof to an extent such that bubble 32 was aligned with line 1 of indicia 24; when the fluid pressure was two inches of mercury, the bubble would be aligned with line 2; etc. After the proper setting of the bias of member 12 was obtained, setscrew 19 would be tightened to hold the adjustment. Member 12 may be formed of any suitable spring-like material as, for example, spring brass.

*Embodiment of FIGURES 4 and 5*

This embodiment is formed so that pressure differentials involving pressures other than atmospheric can be measured. Of course, it can be employed for measuring pressures above and below atmospheric pressure also. It comprises a fluid-tight case having a main case section 35 and a cover section 36. A gasket 37 is used to obtain a seal between the case sections. The cover is held in place by screws 38 which are threaded into openings in corners 39 of the main case section. The tubing fitting 40 is secured to main section 35 and has an internal opening communicating with the interior of the case. A gasket 42 forms a seal by the pressure supplied by head 43 on the fitting and nut 44 threaded thereon.

Like the embodiment of FIGURE 1, this embodiment includes a body generally 47, a slack sac generally 48, a contact member generally 49 and an indicating means generally 50. A tube 51 is inserted into and secured to the mouth of sac 48 through internal passageways 52. Tube 51 communicates with a tubing fitting 53 threaded into a portion of passageway 52.

Cylinder 55 is rotatably mounted in a cylindrical opening in body 47 and held in place by a setscrew 56. End 57 of contact member 49 is held in a slot in cylinder 55. End 58 of contact member 49 is free. Member 49 has a contact face 59 in juxtaposition to sac 48, and it forms a loop 60 between the portion that defines face 59 and end 57. Body 47 defines a contact surface 61 in juxtaposition with a side of sac 48.

In this embodiment the indicating means 50 is in the form of a double-throw, single-pole electrical switch. Thus, there is a double contact 64 mounted on a bracket 65. Bracket 65 is secured to contact member 49 with an insulating block 66 being physically interposed so that bracket 65 is electrically insulated from contact member 49. An upper electrical contact 67 and a lower electrical contact 68 are mounted on spring arms 69 and 70 respectively. Arms 69 and 70 are held in an insulatnig block 71. In turn block 71 is fixed to platform 72 of a range arm 73. A pin 74 pivotally secures range arm 73 to main case section 35 with a sealing washer 75 being interposed therebetween. A scale 76 is associated with range arm 73.

A polarized jack 80 is secured to main case section 35 by a nut 81. A sealing washer 82 is employed to prevent fluid leakage. Jack 80 has three terminals. A wire 83 connects one terminal to bracket 65 and thus to contact 64. A wire 84 connects another terminal to arm 69 and thus electrical contact 67. A wire 85 connects the third terminal to arm 70 and thus electrical contact 68.

Assuming that the embodiment of FIGURES 4 and 5 was to be employed to measure the fluid pressures above atmospheric, a hose communicating with the fluid pressures to be measured woud be secured to hose fitting 53. Fitting 40 would remain open to atmospheric pressure. Range arm 73 would be set at a pivotal position such that contacts 64 and 68 remain closed until a predetermined fluid pressure in sac 48 was achieved. The achieving of this pressure would be indicated electrically by the separation of the contacts. After the fluid pressure in sac 48 had increased an additional increment, electrical contacts 64 and 67 would be closed by the upward movement of member 49 and electrical contact 64, thus indicating a particular fluid pressure condition. An adjustment is provided by the rotation of cylinder 55 and thus the pre-loading of member 49; the pivotal position of range arm 73; and by the separation of contacts 67 and 68. The latter separation can be controlled by the bending of arms 69 and 70 or by their separation as determined by their mounting in insulator block 71. These various adjustments permit an almost unlimited application of the apparatus.

If the user desires to measure pressure differentials, one fluid pressure is applied to the interior of the case through tubing fitting 40, and the second fluid pressure is applied to the interior of sac 48 through tubing fitting 53. If the user desires to measure vacuums, i.e., pressures below atmospheric, the tubing fitting 53 is left open to atmospheric pressure while the vacuum is applied to the interior of the case through tubing fitting 40.

It will be obvious from the foregoing description that a vial and scale such as that illustrated at 31 and 23, 24 in FIGURE 1 may be applied to the embodiment of FIGURES 4 and 5. As will be seen in FIGURE 5, there is adequate room at the front side of main case section 35 (the right-hand side in FIGURE 5) to receive the bubble glass and its associated scale. In that event a viewing window would be provided in cover 36 so that the user can see the position of the bubble with respect to the indicia of the scale. Also binding posts to provide electrical connections to wires 83, 84, 85 may be used rather than the jack 80.

*Emobidiment of FIGURE 3*

The embodiment of FIGURE 3 will be recognized from that drawing as a dial-type pressure gauge. It comprises a body 90 having a face plate 91 secured thereto as by means of screws 92. A shaft 93 is rotatably mounted in body 90 and face plate 91. An indicator for pointer 94 is secured to shaft 93 in front of face plate 91. Over the face plate 91 is a protective cover (not shown) forming a fluid-tight seal with body 90 and having a transparent face for viewing pointer 94. Indicia 95 appears on face place 91 associated with pointer 94. A tapped opening 96 is provided for fluid communication with the interior of body 90, and a tapped opening 97 is provided for fluid communication with the interior of slack sac 98.

In juxtaposition to one side of sac 98 is contact surface 100 of body 90. At the opposite side of sac 98 is contact face 101 of contact member 102. One end of contact member 102 is secured to body 90 by screw 103. The other end of the contact member has an opening in which is received link 104. Link 104 is also hooked in an opening in arm 105 secured to shaft 93.

Contact member 102 is of a spring material and is urged into contact with the side of sac 98. When fluid under pressure is injected into the interior of sac 98 through opening 97, the sides of the sac are separated so that the sac pushes contact face 101 in a direction away from contact surface 100. Thus, for example, the contact member 102 moves to the position shown in dotted lines at FIGURE 3. In doing so, link 104 pushes on arm 105 to rotate shaft 93. When the pressure in the interior of sac 98 is relieved, contact member 102 by its own urging moves back toward contact surface 100 of the body and returning the pointer 94 to its original position. Pointer 94 is frictionally secured to shaft 93 by a push fit. Thus, to set pointer 94 to its 0 position, it is merely necessary to pull the pointer from the shaft and to put it back on the shaft in the proper position. For a vacuum gauge the vacuum is applied at opening 96 while opening 97 remains open to atmosphere. For a differential pressure gauge the two pressures are applied at the two openings 96 and 97.

*Embodiments of FIGURES 6–8*

In this embodiment there is a body formed by a main housing 110 and a bottom cover plate 111. Housing 110 has flanges 112 by which it can be fastened to a panel or other vertical supporting surface. Housing 110 is formed of a transparent plastic such as Lucite. Communicating with the internal opening 113 of the housing is a tapped opening 115 to which tubing 116 may be connected by means of tubing fittings 117.

Within opening 113 is a contact member 119. Contact member 119 forms a loop 120 and is secured to a semi-cylindrical adjusting arm 121 by means of screws 122. Adjusting arm 121 has an integral portion 123 which is threaded into housing 110. Setscrew 124 releasably holds threaded portion 123 in place. An O-ring 125 in a groove in housing 110 forms a seal about the threads. Contact member 119 rests on a slack diaphragm 126. Diaphragm 126 is clamped between housing 110 and cover plate 111 by the tightening of the cover plate screws 127.

Thus, the diaphragm 126 defines an opening 130 between it and cover plate 111. So that this opening never will be entirely closed, cover plate 111 has a dished area 131 therein. A passageway 132 communicates between opening 130 (in the dished area 131) and tapped opening 133. A tubing 134 may be connected to and communicate with opening 133 by means of tubing fittings 135.

Brackets 137 and 138 are secured to contact member 119. A scale plate 139 is pivotally secured to bracket 138 by pin 140. At the other end, plate 139 is held in place by a screw 141 which passes through a slot 142 in bracket 137 and is threaded into plate 139. By loosening screw 141, plate 139 may be adjusted vertically, after which screw 141 is retightened, to permit this adjustment to be made, there is a tapped opening 143 in housing 110 which is closed by a removable plug 144. As in the embodiment of FIGUURE 1, plate 139 has lip 145 which holds a bubble glass 146. Glass 146 is curved downwardly from end to end and is filled with liquid except for a small gas bubble 147. Since housing 110 is transparent, glass 146 and the bubble 147 may be seen from outside the housing. Indicia, not shown, are provided on the face of plate 139 adjacent glass 146.

The apparatus as illustrated in FIGURES 6–8 is for use as a flow meter. Cover plate 111 has two tapped openings. One, opening 150, communicates with chamber 113, while the other, tapped opening 151, communicates with opening 133. A tube 152 is connected to and communicates with opening 150 by means of a fitting 153 and is connected to and communicates with opening 151 by means of a fitting 154. Tube 152 has an internal passageway of a predetermined diameter from end to end. Fluid will flow through this passageway in a laminar flow. The tube is calibrated so that one can determine the amount of fluid that will flow therethrough for any given pressure differential applied across the length thereof.

Thus, for example, it might be known that if fuel oil for an oil burner is applied to tube 134 (and thus opening 133) at a given pressure and the pressure in chamber 113 was lower than the applied pressure by a measured number of pounds per square inch, the flow through tube 152 would be a particular number of gallons per hour. Thus, instead of having the indicia on plate 139 calibrated in pounds per square inch, it could be calibrated in gallons per hour for a particular tube 152. By changing the length and/or diameter of tube 152, a rate of flow therethrough could be appropriately changed. In the oil burner illustration, the oil from chamber 113 would flow through tube 116 in the burner itself.

A tube having laminar flow therein will provide a much more accurate flow measurement on the average than will an orifice across which the pressure differential is measured. Particularly for small rates of flow the size of the orifice must be so small that it is difficult to form with a high degree of accuracy. Furthermore, even the most minute burrs, sediment, etc., will change the flow through the orifice. The laminar flow tube 152 is not subject to such problems to anything like the degree that they are present in an orifice type flow meter.

The embodiment of FIGURE 6–8 may be used as a differential pressure gauge by removing fittings 153 and 154 and putting plugs in openings 150 and 151. In that event the higher of the two pressures to be compared is applied to tube 134, while the lower is applied to tube 116. Of course, by leaving tube 116 open to atmosphere, pressures in tube 134 may be measured. Conversely, by leaving tube 134 open to atmosphere, vacuums applied to tube 116 may be measured.

I claim:

1. A fluid gauge comprising in combination: a body having a surface; means including a slack diaphragm forming a pressure chamber in juxtaposition to said surface; a member mounted on said body for movement away from and toward said surface, said member being in juxtaposition to said diaphragm on the side thereof opposite said surface and being resiliently urged toward said diaphragm the mounting of said member including a cylinder connected to the body for rotation about an axis parallel to said surface, said member comprising an elongated strip of metal having two ends, one of said ends being held by said cylinder, said body having means normally holding said cylinder against rotation but permitting a user to rotate the cylinder and thereby change the angular position of the one end of the member about the axis of rotation of the cylinder; means connected to the member to indicate a positional relationship of the member with respect to said surface; and means communicating with said chamber and through which the fluid pressure within the chamber may be varied, whereby the sac expands or contracts moving the member away from or permitting it to move toward said surface in response to said urging.

2. A gauge as set forth in claim 1, wherein said body forms a fluid-tight enclosure on the opposite side of said diaphragm from said chamber and has means communicating with the interior of the enclosure through which the fluid pressure conditions in the interior of the enclosure may be varied whereby the indicating means responds to the differential of the pressures at the two sides of said diaphragm.

3. A gauge as set forth in claim 1, wherein said member is resilient and the other end thereof is free, said member having a face adjacent said other end in contact with said diaphragm, said member forming a loop between said surface and said one end.

4. A gauge as set forth in claim 1, wherein said indicating means comprises a curved, generrlly horizontal, bubble glass, and a scale associated with said class.

5. A gauge as set forth in claim 4, wherein the indicating means has an adjustable connection between the bubble glass and the member whereby the user may adjust the reading of the glass for a given position of the member.

6. A fluid gauge as set forth in claim 2, including a calibrated laminar flow passageway connecting said chamber and said enclosure.

7. A fluid pressure gauge comprising in combination: a body having a contact surface; a cylinder mounted in said body for rotation about an axis parallel to said surface; said body having means to normally restrain said cylinder against rotation while permitting a user to rotate the cylinder for adjustment purposes; an elongated resilient metal member having two ends and a contact face between said ends, said face being generally parallel to and spaced from said surface, one of said ends being secured to said cylinder; slack means associated with said surface and forming a fluid enclosure between said surface and said face and a member forming a fluid connection to said enclosure, said means being in contact with said face, a fluid connection device mounted on said body, and communicating with the enclosure through the fluid connection and providing an external fluid connection for the enclosure; indicating means connected to said member at a point spaced from said one end, said indicating means comprises a curved, generally horizontal, bubble glass, and a scale having indicia associated with said glass.

8. A gauge as set forth in claim 7, wherein said body forms a fluid-tight case about said surface enclosure, and member and has means communicating with the interior of the case through which the fluid pressure conditions in the interior of the case and outside of said enclosure may be varied whereby the indicating means responds to the differential of the pressures outside and inside of said enclosure.

9. A gauge as set forth in claim 8, including a calibrated laminar flow passageway communicating between said enclosure and the interior of said case externally of the enclosure.

References Cited

UNITED STATES PATENTS

| | | | |
|---|---|---|---|
| 621,486 | 3/1899 | Burdick | 73—409 |
| 1,473,171 | 11/1923 | Bowden | 73—409 X |
| 1,581,480 | 4/1926 | Andersen et al. | 73—409 |
| 2,252,874 | 8/1941 | Vischer | 73—409 |
| 2,517,820 | 8/1950 | Aagaard | 73—406 X |
| 2,664,750 | 1/1954 | McCrink | 73—409 |
| 3,130,586 | 4/1964 | Taylor et al. | 73—406 |
| 3,302,167 | 1/1967 | Andresen | 73—407 X |
| 1,935,736 | 11/1933 | Colvin et al. | 73—179 |

LOUIS R. PRINCE, *Primary Examiner.*

D. O. WOODIEL, *Assistant Examiner.*